United States Patent

[11] 3,611,317

[72] Inventor Murray David Bonfeld
Allentown, Pa.

[21] Appl. No. 7,915
[22] Filed Feb. 2, 1970
[45] Patented Oct. 5, 1971
[73] Assignee Bell Telephone Laboratories, Incorporated
Murray Hill, N.J.

[54] NESTED CHIP ARRANGEMENT FOR INTEGRATED CIRCUIT MEMORIES
13 Claims, 4 Drawing Figs.

[52] U.S. Cl. .......... 340/173 R, 328/235 AJ
[51] Int. Cl. .......... G11c 11/40
[50] Field of Search .......... 328/235 AJ; 340/173 FF; 29/203 B

[56] References Cited
UNITED STATES PATENTS

| | | | |
|---|---|---|---|
| 3,187,309 | 1/1965 | Dodd .......... | 340/173 |
| 3,218,613 | 11/1965 | Gribble et al. .......... | 340/173 |

*Primary Examiner*—Terrell W. Fears
*Attorneys*—R. J. Guenther and Kenneth B. Hamlin ABSTRACT: Integrated circuit, multicell, memory chips have their row and column circuits turned with respect to continuous nonintersecting circuits of a bus, which is deposited on a substrate, for convenience of bonding to those circuits. Additional chips of the same type are nested between turned chips on adjacent buses and connected to utilize half of the circuits of each adjacent bus. A first one of the buses also has half of its circuits extended to connect to additional chips nested with a second one of the adjacent buses but not otherwise connected to the first bus. External connections for power supply on each chip are symmetrically arranged with respect to chip row and column circuits.

INVENTOR
M. D. BONFELD
BY
Charles Scott Phelan
ATTORNEY

NESTED CHIP ARRANGEMENT FOR INTEGRATED CIRCUIT MEMORIES

BACKGROUND OF THE INVENTION

1. Field of the Invention

This invention relates to integrated circuit systems in which semiconductor chips with plural circuit cells formed therein are bonded to interconnecting circuits on a common substrate. More particularly, the invention relates to an arrangement for the distribution and interconnection of an array of similar multicell chips on a common substrate.

2. Prior Art

Multicell integrated circuit chips are usually bonded to a common substrate and connected to discontinuous bus circuits of interconnecting buses. For example, chips containing rows and columns of cells also have row and column circuits interconnecting the cells for operation. such circuits of different chips are connected in series to form rows and columns of chips on the common substrate. Thus, that substrate is provided with interchip bus circuits so that a row or column circuit extends continuously to, through, and between chips only after the chips are in place on the substrate. Consequently, such a substrate has many short segments of circuits deposited thereon that must be tested for isolation and continuity before the chips are bonded in place. Tests of this sort are becoming increasing difficult and time consuming as chips with smaller cells and greater packing density are evolved.

Some work has been done in the direction of making substrate bus circuits continuous across the substrate so that they can be more easily completely tested prior to chip assembly. Integrated circuit chips which are bonded to these substrates usually must be designed to form parallel current paths for bus circuit signals or to operate in a voltage-responsive mode without drawing substantial cell current from the bus. Since chip circuits often represent a rectangular array of cells, it has been found to convenient to turn the chips so that a diagonal of each array on a chip is parallel to the direction of the substrate buses in order to make chip row and column circuits available for connection to bus circuits without making bus circuit layout patterns on chip and substrate too complex. However, the array of turned chips, sometimes called an in-line array, takes up considerably more substrate area than would the prior art arrangements, and such an array has also required extensive metallization for bus circuits extending between turned chips. Both factors add significantly to circuit costs.

SUMMARY OF THE INVENTION

The foregoing problems of integrated circuit arrays are reduced in severity by adding to a plurality of turned, in-line, multicell, integrated circuit chips, which are connected to circuits of an underlying common bus, at least one additional chip of the same type which is nested between adjacent turned chips on the bus. Each nested chip overlies and is connected to a part of the bus circuits extending between interconnected sides of adjacent turned chips. To the extent that additional buses with in-line chips are provided, the nested chips utilize part of the circuits of each of two adjacent buses. External chip connections for chip cell control are symmetrically arranged with respect to power connections to facilitate the cooperative connection of nested chips with adjacent buses.

BRIEF DESCRIPTION OF THE DRAWINGS

A more complete understanding of the invention and of its various features may be obtained from a consideration of the following detailed description when taken in connection with the appended claims and the attached drawings in which:

DETAILED DESCRIPTION

Figure 1:
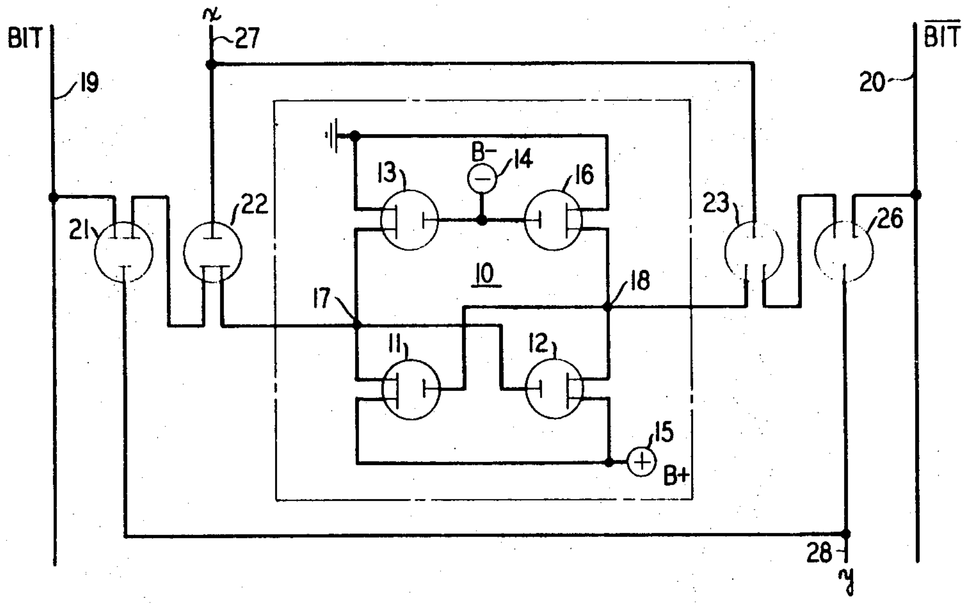
FIG. 1 is a schematic diagram of one form of integrated circuit cell which is useful in conjunction with the present invention.

The invention is here described in its application to an integrated circuit memory system. Thus, FIG. 1 illustrates a single memory cell which is operated in an X–Y access mode, i.e., a coincidence of enabling signals is required to allow operational access between the cell and its associated bit access circuits. P-channel, insulated gate, field-effect transistors are used in the illustrative embodiment here under consideration. The memory cell 10 in FIG. 1 includes two transistors 11 and 12 which have their gate and drain electrodes cross-coupled for operation as a bistable circuit to store binary coded signal representations in a manner now known in the art. Two further transistors 13 and 16 have their source-drain conduction paths connected in series with corresponding paths of transistors 11 and 12, respectively, to operate as load resistors for the latter transistors. Gate electrodes of transistors 13 and 16 are connected to a B− source 14 which advantageously has its positive terminal connected to ground. Drain electrodes of the latter two transistors are connected together and to ground. Source electrodes of transistors 11 and 12 are connected to a B+ potential source 15 which has its negative terminal connected to ground. The names "B+," "ground," and "B−"are here utilized for convenience of description to indicate the relative magnitudes of the potentials employed, e.g., +6 volts, zero volts, and −3 volts, respectively. In one embodiment of the invention, however, the voltages are shifted to eliminate negatives so that the B+ voltage is +9 volts, ground is +3 volts, and B− is 0 volts. The B− source could, of course, be eliminated by connecting gate electrodes of transistors 13 and 16 to ground, but operational margins are better with the separate B− connection as shown.

Each of two bit access terminals 17 and 18 of the cell 10 is connected to a different one of the true and complement bit lines 19 and 20, respectively, by two different pairs of gating transistors 21, 22 and 23, 26. Source-drain conduction paths of each such pair of transistors are connected in series between one of the cell bit access terminals and a corresponding bit line so that a coincidence of gate signals for enabling conduction in the gating transistors is required to establish operational bit circuit coupling. Gate electrodes of the inner transistors 22 and 23 of each pair are connected to together and to an $x$ circuit 27 to receive enabling signals. Similarly, gate electrodes of the outer transistors 21 and 26 of each pair are connected together and to a $y$ circuit 28 for receiving enabling signals.

Circuits 27 and 28 are normally held at a positive voltage and driven toward ground to enable gating transistors. A coincidence of ground-going $x$ and $y$ signals on circuits 27 and 28 enable bit type coupling so that bit circuits 19 and 20 assume the voltage levels of bit access terminals 17 and 18, respectively, during a readout operation. Those voltage levels are coupled by the bit circuits to a sensing amplifier, not shown, which indicates whether the cell 10 is storing the binary ONE or a binary ZERO by indicating which of the two circuits 19 or 20 is at the higher potential. Similarly, during the writing operations, the output of a balanced digit driver is applied between circuits 19 and 20 for forcing the enabled cell 10 to the binary condition indicated by that output.

Figure 2:
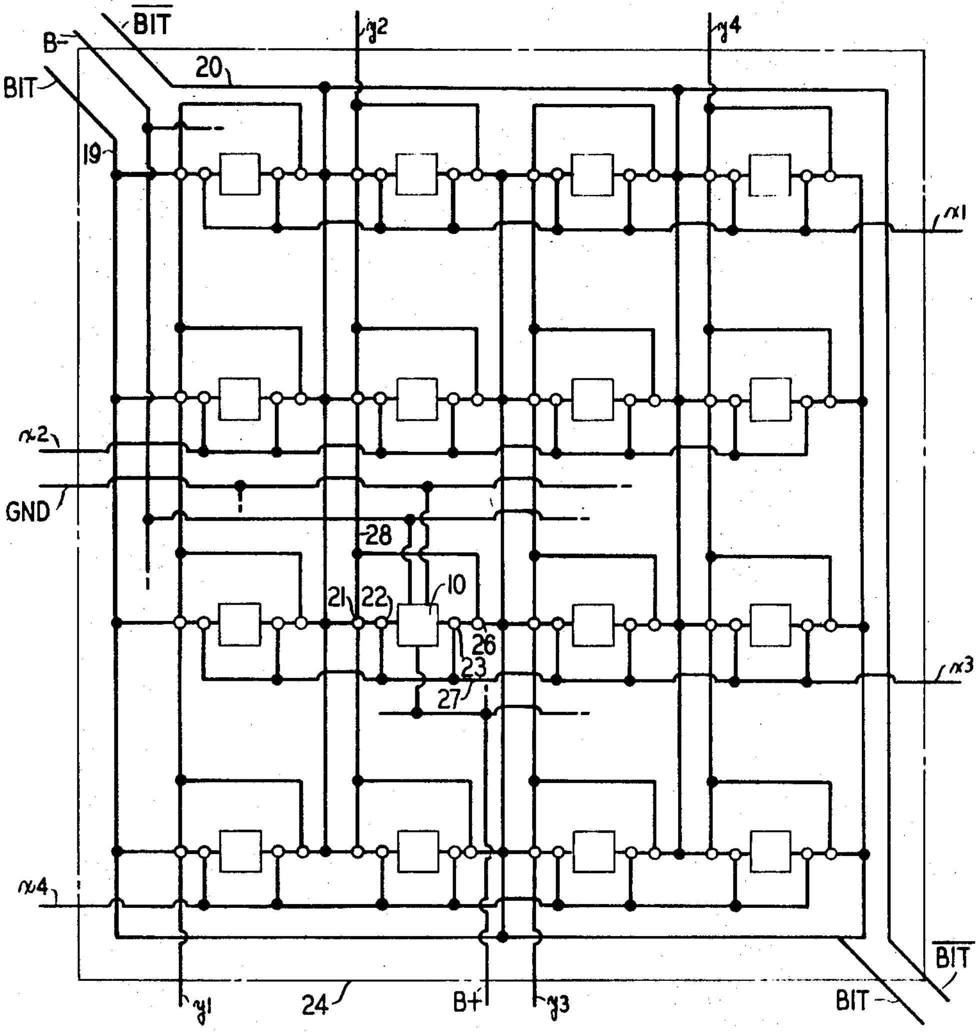
FIG. 2 is a simplified schematic diagram of an array of cells of the type shown in FIG. 1 in a single integrated circuit chip.

In FIG. 2 there is shown a 16-cell array of integrated circuit memory cells, of the type shown in FIG. 1, formed in a single semiconductor chip 24. Circuits are actually on the underside of the chip, but for convenience of illustration the circuits are considered to be seen through the chip as though it were transparent. Each cell is schematically represented by a square in FIG. 2, and cell 10 is indicated as the second cell from the left in the third row from the top. Associated interconnected circles schematically represent the gating transistors 21, 22, 23, and 26. *x* circuit 27 in FIG. 2 supplies enabling signals to gates of transistors 22 and 23 and supplies similar signals to other cells in the same row with cell 10. This circuit is further designated *x*3 in FIG. 2 since it is the third of four similar *x* circuits supplying enabling signals to the four rows of the array. In like manner *y* circuit 28 supplies enabling signals to transistors 21 and 26 and to similar transistors for other cells in the same column as cell 10. Circuit 28 is in FIG. 2 further designated *y*2 since it is the second of four *y* circuits supplying enabling signals to the four columns of cells in the array.

Each of the bit circuits 19 and 20 extends to each cell in the chip and has terminations for external connections as shown in the upper left and lower right-hand corners of the array. Thus, bit circuits of a plurality of chips are connectable in series with one another.

Power circuits for supplying operating potential to the various cells in FIG. 2 are shown only in part in order to preserve the simplicity of the drawing for better understanding of the present invention. External connection points for such circuits are located on different axes of geometrical symmetry of chip 24. Thus, the B+ supply is connected to the chip in FIG. 2 by a bus adjacent to the column circuit *y*3 midway along the bottom edge of the square chip as shown in the drawing. This power bus extends to all of the cells in the chip, but connection to only the cell 10 is shown, and partial connections extending toward other cells are simply indicated. Similarly, a ground bus for all of the cells of the chip has an external connection midway in the left-hand side of the chip as illustrated in FIG. 2. The B− connection for all of the cells is supplied between the bit lines 19 and 20 on a chip diagonal that spans the chip sides on which the other two power connections are located. That B− circuit also extends to cell 10 as well as other cells of the chip.

Within a chip, the three sets of power circuits B+, ground, and B− cross under other circuits of the chip; and the pattern therefor is relatively unimportant because the resistance and capacitance of such crossunders in the power circuit are not critical to cell operation. Remote cells are, of course, at a slightly lower voltage than cells which are closer to the power supply, but this does not seriously affect cell operation because there is ample detection margin in double-rail bit circuit systems of the type illustrated and which are known in the art. Power circuit connections have been located midway in two sides of a chip and between bit connections. It will subsequently be shown that these power connections are located along axes of symmetry for cell control connections so that chips may be coupled into the array of the invention in either of two positions 180° apart along the chip diagonal extending between the bit circuit terminations.

In FIG. 2 among on *x*, or row, circuits, odd-numbered circuits terminate on the right-hand side of the chip 24 and even-numbered circuits terminate on the left. Similarly, odd-numbered *y*, or column, circuits terminate at the bottom of the chip, and even-numbered column circuits terminate at the top. These termination arrangements for *x* and *y* circuits facilitate connection to continuous bus circuits when the chip 24 is turned to an orientation of the type illustrated in FIG. 3. All of the row and column circuits in FIG. 2 are metallized circuits deposited on the chip, and crossunders comprise interruptions in the metallization pattern at which diffused connection spots are provided for connecting ends of metal deposits to a lower conductive layer of semiconductor material which constitutes an electrical crossunder path to permit electric circuit path intersection without interconnection. Such crossing is desirable for rectangular arrays of the type illustrated in FIG. 2.

Figure 3:
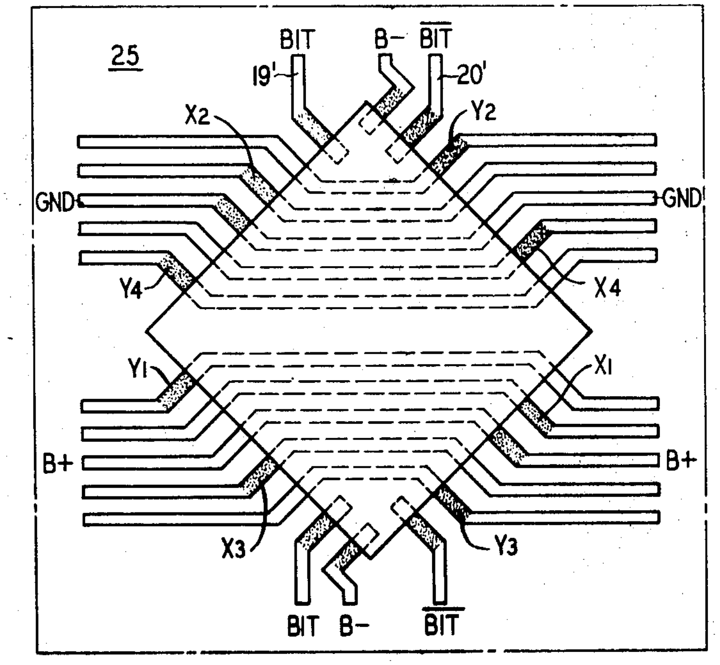
FIG. 3 is a diagram illustrating the relationship between an integrated circuit chip of the type shown in FIG. 2 and a bus arrangement with continuous nonintersecting circuits.

A chip 24 such as that shown in FIG. 2 has its intersecting row and column circuits bonded to a continuous bus arrangement, which has corresponding nonintersecting circuits in the manner illustrated in FIG. 3. The ground and B+ circuits are similarly bonded to bus circuits. Bit circuits and B− circuits of the chip are bonded to corresponding discontinuous circuits. The bus circuits, bit circuits, and B− circuits to which the chip is bonded are all deposited in substantially the same plane on a common substrate 25, which is shown in part in the drawing. The chip is turned to the orientation shown in FIG. 3 wherein the chip diagonal which is perpendicular to the bit termination diagonal extends in a direction that is approximately parallel to the general direction of the bus. Details of the cells and their interconnection have been omitted in FIG. 3 in order that broken lines representing chip-interconnecting bus circuits on common substrate 25 and passing under the chip may be seen.

In FIG. 3 the chip orientation is readily apparent from the outline of the square representing the chip 24 and from the bus circuit reference characters which are similar to those employed in FIG. 2. Thus, in FIG. 2 chip row and column enabling circuits were identified by alphameric characters with lower case alphabetic portions; in FIG. 3 corresponding bus circuits have similar characters with upper case alphabetic portions. Substrate bit circuits in FIG. 3 have primed numerals otherwise the same as in FIG. 2. Power circuits carry the same reference in both figures. Stippled portions on the respective substrate circuits represent bonded connections, e.g., by beam leads, between the circuits of the chip and the corresponding continuous circuits of the underlying bus. Bonds at these points function both as electrical connection and as means to secure the chip to the substrate 25 and with the circuits on the underside of the chip spaced for insulation purposes from the bus circuits as is known in beam lead technology.

Figure 4:
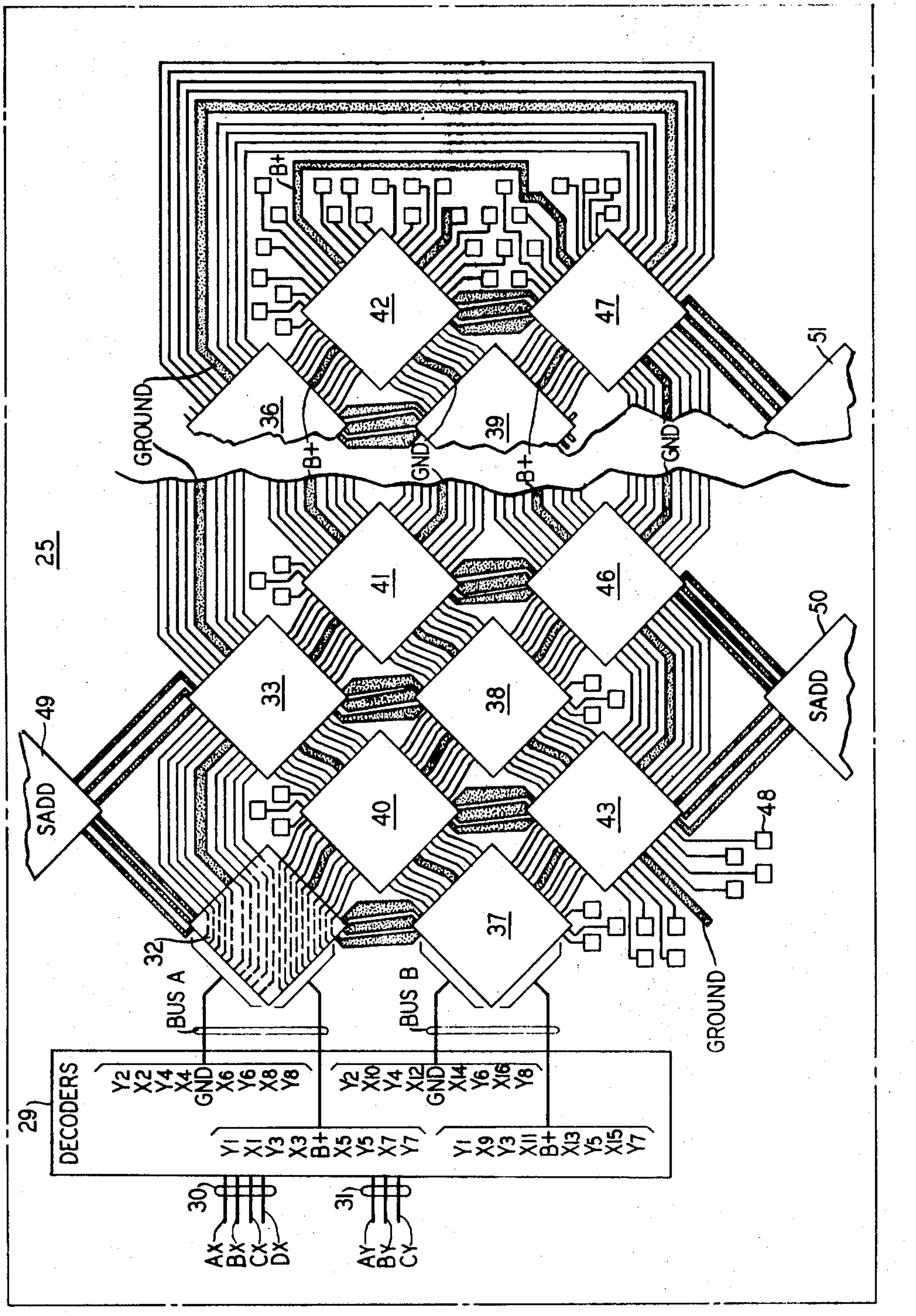
FIG. 4 is a simplified diagram of a plurality of integrated circuit chips on a common substrate in accordance with the present invention.

For reasons which will become apparent in the subsequent discussion of FIG. 4 and having to do with the reversibility of chip position along one diagonal, the control circuits for the cells of chip 24 are brought to external connection terminals that permit corresponding substrate bus circuits to be symmetrically arranged with respect to the bus circuits connected to chip power supply circuits. To this end, the B− connections in FIG. 3 are located between bit circuits 19 and 20. Similarly, a symmetrical pattern of X and Y circuits is found extending transversely in either direction from either the ground circuit or the B+ circuit of FIG. 3. For example X circuits X2 and X4 are adjacent to opposite sides of the ground circuit and Y circuits Y2 and Y4 and found on opposite sides one step further away from the ground circuit.

It will be seen upon relating FIGS. 1, 2, and 3 that when the voltage is raised on a single X circuit and a single Y circuit all cell gate transistors connected to the selected X and Y circuits are enabled, but the two pairs of such gate transistors for only one cell on a chip are enabled since the intersection of any single *x* circuit and any single *y* circuit on a chip defines a unique cell thereon. When the single cell is enabled, signals on the bit circuits 19 and 20 flow readily throughout the chip without affecting any cell except the one which is enabled. It can be seen in FIG. 3 that the X and Y circuits and the B+ and ground circuits of chip 24 are connected to continuous, corresponding circuits of a bus passing under the chip. However, the bit circuits and the B− power circuit are discontinuous on the substrate since they are parts of electric current flow loops that are completed through cell power connections in whichever cell along the bit circuit is enabled by X and Y signals. These three discontinuous circuits are made comparatively large on the common substrate 25 so that they can be easily checked for continuity by visual means and checked for isolation electrically before chips are bonded to the substrate.

Turning now to FIG. 4, a larger portion of the substrate 25 is shown with a plurality of integrated circuit chips of the type depicted in FIGS. 2 and 3 interconnected in accordance with the invention. Each chip is connected to one or more buses in essentially the same fashion as that shown in FIG. 3 with the exception that the chips indicated in FIG. 4 are 64-cell chips, a convenient size for practical operation, instead of 16-cell chips, a convenient size for showing relevant chip details. Decoders 29 are controlled from a central processor (not shown) in response to binary coded address signals which define the number of one X circuit out of sixteen such circuits, and one Y circuit out of eight such circuits. The binary coded signals $A_X$, $B_X$, $C_X$, and $D_X$ are provided on an address bus 30; and signals $A_Y$, $B_Y$, and $C_Y$ are provided on a bus 31. The decoders respond to address signals by producing a low output voltage on the single X circuit and single Y circuit in one of two buses provided for the array of FIG. 4. Decoders 29 include a crossover distribution network for directing circuits into the output groupings shown in FIG. 4 for bus connection. Each bus includes eight separate X circuits, eight separate Y circuits, and ground and B+ circuits.

The bus A includes circuits X1 through X8 and Y1 through Y8 and applies these, with the mentioned power circuits, to in-line chips 32, 33, and 36. The term "in-line chips" is here used to designate chips having *x*, *y* B+, and ground circuits connected entirely to circuits of a single bus. The even-numbered X and Y circuits in the drawing are applied to the upper left side of chip 32 while odd-numbered circuits are applied to the lower left side of chip 32. Such bus circuits extend continuously across the substrate 25 passing under the respective chips with individual circuits being bonded to corresponding chip circuits at each chip in accordance with symmetrical patterns of the type indicated in FIG. 3, as further amplified by the respective odd and even circuit groups of circuit designations shown in decoders 29. It will be observed in FIG. 4 that within any circuit group in a bus the patterns of X and Y alternation extend symmetrically outward from either side of the power circuit. The bus B shown in FIG. 4 extends to a row of in-line chips 37, 38, and 39 in much the same fashion previously described for the chips 32, 33, and 36.

Nested between two rows of chips are additional integrated circuit chips of the same type as the in-line chips and placed in similar turned but parallel orientation with respect to the buses. These are the nested chips 40, 41, and 42. The latter chips each overlie only one of the two groups of circuits in each of the buses A and B. In bus A they overlie the odd-numbered X—Y circuits and the B+ bus circuit, all lying in the lower portion of bus A as illustrated, while they overlie the even-numbered bus circuits and the ground circuit in the upper part of the bus B. It can now be seen that the B+ circuit, for example, passes under the lower portion of chip 32 and under the upper portion of chip 40. The same inversion applies all along the B+ circuit and along the ground circuit in similar manner. This fact indicates the need for the condition previously mentioned whereby nested chips such as chips 40, 41, and 42 are rotated to positions 180° from positions of the in-line chips 32, 33, and 36. That is, nested chips must be inverted to provide proper power circuit connection in a system which utilizes a uniform chip throughout the array. Additional nested chips 43, 46, and 47 are associated with the chips of the bus B and overlie only the odd-numbered circuits of that bus. However, the even-numbered circuits of bus A are extended beyond the chip 36 to fold around the right-hand end of the array and pass back to serve the nested chips 43, 46, and 47 so that all cells on those chips may be accessed. These even-numbered circuits of the bus A terminate at respective test pads such pads such as the pad 48 adjacent to chip 43 to provide a convenient place for applying test probes to check the continuity and isolation of the various bus circuits. Similar test pads are shown to the right of chips 42 and 47 for all of the circuits of bus B as well as the odd-numbered circuits of bus A.

For ideal utilization of substrate space and of metallization a cylindrical substrate would be the one to use so that, for example, the lower portions of chips 43 and 46 could overlie bus A even circuits and nest between chips of adjacent chip pairs 32, 33 and 33, 36, respectively. The foldback of even-numbered bus A circuits provides a convenient substitute for the cylindrical substrate while at the same time causing substantially the same numbers of cells to load each group of circuits in a bus. Although cells of the type in FIG. 1 do not draw a large current from the X and Y bus circuits, there is a certain amount of transient current drawn by distributed impedances along those circuits during X and Y signal rise times. Consequently, unequal cell loading among bus circuits would affect those distributed impedances and cause signal rise time differentials among the circuits. Worst-case rise times must, of course, be accommodated by an extended memory cycle time.

Power supply circuits are also involved in the folding of FIG. 4. A ground connection is folded around with the bus A even-numbered circuits between chips 36 and 47. A B+ circuit from chip 42 is folded around by itself to chip 47. A further ground circuit extends, without folding, across the substrate with even-numbered circuits of bus B. Thus, all parts of all chips get appropriate power supply voltages.

In lieu of folding power circuits and the even-numbered bus A circuit, decoder outputs for those same circuits can also be simply fanned out to serve the same parts of the same chips as are served in FIG. 4. Likewise X and Y decoder outputs can be applied to opposite sides of the substrate when there is no folding so that less complex crossover patterns are possible for distributing those outputs to appropriate bus terminals on the substrate. Choices among folding, fanning, and decoder output connection positioning will vary with designers and particular circuit applications.

In the embodiment of FIG. 4, corresponding in-line chips on the two illustrated bus circuits have their bit circuits and B— circuits connected in series with one another and connected to terminals of a sense-amplifier-digit-driver. Chips 32 and 37 are connected in this fashion and connected to the sense-amplifier-digit-driver 49. The latter circuit advantageously includes two amplifier-driver sets, the second one of which serves series-connected chips 33 and 38. Other pairs of corresponding in-line chips on the two bus circuits are similarly interconnected and served by amplifier-driver circuits (not shown). In a similar manner the pairs of nested chips 40, 43 and 41, 46 are provided amplifier-driver functions by a circuit 50 while a circuit 51 performs the same function for chips 42 and 47. A number of amplifier-driver circuits are known in the art and details thereof comprise no part of the present invention. Each of the series-connected bit circuit arrangements terminates on the common substrate in a test pad similar to the aforementioned pad 48 since, as previously mentioned, bit circuit paths are completed from an amplifier-driver combination through connections to, on, and possibly between the chips and then through the selected cell on the chip and its power supply connections back to the amplifier-driver combination.

It should now be appreciated from the foregoing description of the X—Y enabling bus connections for the chips, and the bit circuit operational bus connections for the chips, that the in-line chips served primarily by a bus and the additional nested chips which share circuits from different buses are operated advantageously without dual selection problems. To this end the total number of bits to be provided in any given word in the memory are distributed among the in-line and nested chips in the illustrated embodiment of FIG. 4. Half of the bits of a word are provided by in-line chips and the other half are provided by nested additional chips. Each X—Y selection in bus A selects a cell on each one of the in-line chips 32, 33, and 36, as well as selecting additional cells in either the nested chips 40, 41, and 42 or the nested chips 43, 46, and 47. Likewise the X–Y selection in bus B selects cells in each of the in-line chips 37, 38, and 39 as well as additional cells in either the nested chips 40, 41, and 42 or the nested chips 43, 46, and 47. Although six separate bit circuit sets are shown in FIG. 4 many more can be conveniently employed as schematically indicated by the broken line portions of the bus circuits adjacent to chips 41 and 46.

There are eight X circuits and eight Y circuits connected to *x* and *y* circuits of each chip in the illustrative embodiment here presented. This might suggest the need for 16 separate outputs in the decoders 29. However, it is actually possible to serve the two illustrated buses with 16 separate X circuits which share the same set of eight Y circuits. Thus, the same Y circuits utilized in conjunction with bus A are also utilized, by a form of fanout, in conjunction with bus B as can be seen by the reference characters in the various groups shown in decoders 29. In so doing, however, it is necessary that the nested chips must be served by even-numbered Y circuits from one bus and odd-numbered Y circuits from the other bus in order to avoid the possibility of dual cell selection along any given bit circuit set.

The arrangement of FIG. 4 is extendible to longer bit circuit sets than the two-chip sets there shown. Thus, for example, the number of words stored in the memory is easily doubled by doubling the number of chips in each series bit path and doubling the number of Y circuit inputs. The added group of Y circuit inputs are then used in cooperation with the original sixteen X circuit inputs so that there still is no dual selection along any given bit circuit. Such an expanded memory arrangement requires four buses instead of the two which are illustrated, and it requires all of the in-line and additional nested chips associated therewith. In folded bus circuit embodiments the folded even-numbered bus circuits of the bus A span all of the rows of chips to link the additional nested chips of the fourth bus while all of the remaining X and Y circuits of each bus terminate after a single pass across the substrate.

Thus, by properly locating power circuits, and by properly locating *x* and *y* enabling circuits, a multicell integrated circuit chip is made reversible along its digit diagonal. Extra turned chips are advantageously nested between in-line turned chips to yield a densely packed memory utilizing continuously wired buses without dual cell selection problems.

Although the present invention has been described in connection with a particular embodiment and modifications thereof, additional embodiments and modifications which will be obvious to those skilled in the art are included within the spirit and scope of the invention.

What is claimed is:

1. In combination, at least one electric circuit bus including a plurality of spaced nonintersecting circuits all lying in substantially one plane, a plurality of integrated circuit chips arranged in a row over and along said bus, each of said chips including a plurality of circuit cells interconnected by at least first and second types of control circuits and by at least one power supply circuit, means interconnecting at least some of said control and power supply circuits of each of said chips to different circuits of said bus, said circuits of said bus being divided into first and second groups, at least one additional integrated circuit chip of the same type as the first-mentioned chips and partially laterally displaced from said bus so that only parts of its cells overlie one of said bus circuit groups and so that each said additional chip nests between two adjacent ones of said first-mentioned chips, and means connecting control and power supply circuits of said additional chip to circuits of said one bus circuit group.

2. The combination in accordance with claim 1 in which said interconnecting means includes means connecting a power supply circuit of each said chip to a circuit in one of said bus circuit groups, and circuits of the last-mentioned group are arranged in a symmetrical distribution pattern of circuits connected to control circuits of said first and second types, the pattern symmetry being about said one power supply circuit.

3. The combination in accordance with claim 1 in which at least one additional electric bus is provided, and each of said buses is connected to substantially the same numbers of first-mentioned chip cells and nested chip cells.

4. The combination in accordance with claim 3 in which means are provided for selectively actuating in first and second ones of said buses one control circuit of each of said first and second types, said actuating means having separate outputs for each of said first type of control circuits of said first and second buses and having separate outputs for each of said second type of control circuits of said first bus, the latter outputs being also applied to said second bus.

5. The combination in accordance with claim 1 in which each of said chips includes said circuit cells arranged in rows and columns with said first and second control circuits being intersecting row and column circuits, respectively, which are coupled in a predetermined manner to said cells, and said chip being turned at an angle so that said row and column circuits are at a predetermined angle with respect to said bus circuits but lie in a plane substantially parallel to said bus circuits.

6. The combination in accordance with claim 5 in which at least one additional electric bus is provided, and means connect a second group of the circuits of the last-mentioned bus to said additional chip row and column circuits which are not connected to said first-mentioned bus.

7. The combination in accordance with claim 6 in which said additional chip includes two power supply circuits, and said interconnecting means includes means connecting each of the latter power supply circuits to a circuit of a different one of the first-mentioned and additional buses.

8. The combination in accordance with claim 5 in which at least a second bus and associated plural chips are provided adjacent to the first-mentioned bus, a plurality of additional chips are provided in association with said first-mentioned bus and between that bus and said second bus with a different portion of the row and column circuits of each such additional chip being connected to a different one of such buses, a further plurality of additional chips nested with said chips associated with said second bus and having a first part of the row and column circuits thereof connected to said circuits of said second bus, and means extending a part of the circuits of said first bus which are not connected to said additional chips between said first and second buses to connect to said further additional chip row and column circuits which are not otherwise connected to said first-mentioned bus.

9. The combination in accordance with claim 8 in which said cells are bistable memory cells connected to row and column circuits of their respective chips to be selectively enabled for memory operation by a coincidence of signals on a unique combination of said row and column circuits for such cell, at least one bit circuit is provided on each of said chips, means couple said bit circuit to every cell on such chip for conveying signals during memory bit-drive-sense operation, and means connecting in series the bit circuits of corresponding chips on said first and second buses and also connecting in series bit circuits of corresponding additional nested chips of said first and second buses.

10. The combination in accordance with claim 1 in which said bus and chips are on a common substrate having additional circuits thereon, means including said interconnecting means connect said power circuits of each of said chips to a different circuit on said substrate, and connect said control circuits to other substrate circuits which are arranged in predetermined patterns of control circuit types that are symmetrical about a power circuit on the substrate.

11. The combination in accordance with claim 10 in which all of said chips are of the same type and geometrical configuration, said configuration having different axes of symmetry at least equal in number to the number of power supply circuits on a chip, said power circuits on each said chip have terminals located on different axes of symmetry of such chip.

12. The combination in accordance with claim 11 in which said nested chips are oriented in positions 180° different, along a predetermined one of said axes of symmetry which is the same for all such chips, from the orientation of adjacent first-mentioned chips.

13. The combination in accordance with claim 11 in which said power circuits include first, second, and third power circuits providing different voltages, respectively, said chip is in an essentially square configuration, and two of said power circuit terminals are located midway along each of two adjacent sides of said square and a third of said power circuit terminals is located on a diagonal of said square spanning said adjacent sides.